May 12, 1942.    J. A. LEWIS    2,282,661
DEVICE FOR HANDLING AND DIPPING CONFECTIONS
Filed Feb. 3, 1940
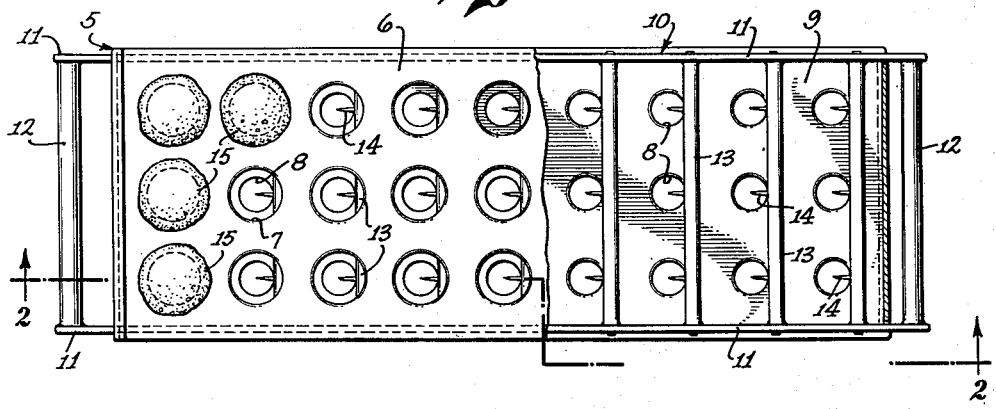
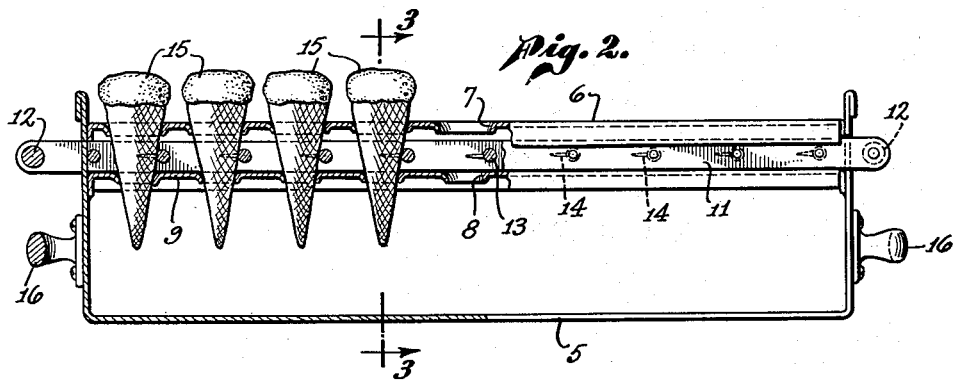
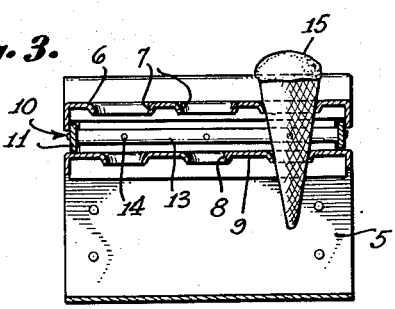
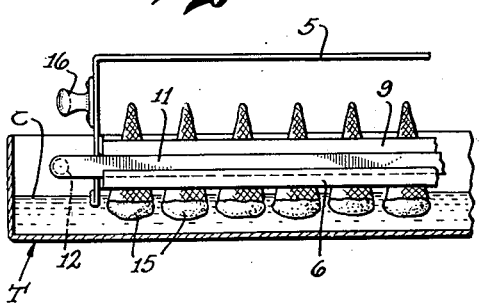
Inventor
JAMES A. LEWIS,
By Everett N. Curtis
Attorney Patented May 12, 1942

2,282,661

UNITED STATES PATENT OFFICE 2,282,661

DEVICE FOR HANDLING AND DIPPING CONFECTIONS

James A. Lewis, San Diego, Calif., assignor to Arden Farms Co., San Diego, Calif., a corporation of Maryland Application February 3, 1940, Serial No. 317,215

6 Claims. (Cl. 91—6)

My invention relates to ice cream cone dipping devices, and its objects are to cover simultaneously with any desirable coating the protruding ice cream ends of a plurality of cake cones filled to overflowing with ice cream, and thereby to dispense with the necessity of dipping separately by hand the end of each individual cone; to produce uniformity of result in effecting such coatings instead of varying result in appearance and in thickness of covering; to lock in proper position and alignment a plurality of cake cones filled with ice cream while the same are in up-end position for the operation of dipping; to readily release said cones from locked position after being so dipped; and in general to bring about a simple arrangement and effective combination of parts for the better accomplishment of dipping of ice cream cones. Other objects and novel features will appear as illustrated in the drawing and hereinafter described and claimed.

As now generally carried on, the process of manufacturing or preparing for the market filled ice cream cones, is first, to pour ice cream while in a fluid condition into cone shaped molds which are thereupon placed in brine tanks, where the ice cream so molded is frozen into a solid state. Thereafter such molds are removed from said tank and are dipped in a warm water bath, with the result that the conical contents of said molds may be easily taken out and packed into a rack of edible containers shaped to receive the same known as "cake cones" which are so constructed that the ice cream will not only completely fill the same, but also will protrude and overflow beyond the mouths of the cones. After this, in order to seal the ice cream of the individual containers and to add to the appearance and edibility thereof, it is generally thought desirable to dip the exposed ends of the ice cream in a tank or other receptacle containing chocolate or other desirable coating substance. This, as generally accomplished, is done by the workman removing from the rack, one at a time, each filled container, and by manually dipping its exposed end in the covering substance in the tank and then restoring the said container to the rack, a procedure requiring considerable skill, time and patience, and lacking uniformity of result. With my improved device, however, a large number of cones, without having to remove the same from the rack, are up-ended and dipped in coating solution simultaneously, and great saving of time, uniformity of treatment and a better product thereby secured.

Attention is hereby directed to the drawing, illustrating one of the preferred forms of my invention, in which similar numerals of designation refer to similar parts throughout the several views, and in which—

Figure 1 is a plan view of my improved dipping device, partly in section, showing the rack for holding the cones and the slidable locking frame carrying the securing pins;

Figure 2 is a side elevation, partly in section on line 2—2 of Figure 1, looking in the direction of the arrows, and showing some of the cones in locked position;

Figure 3 is a transverse section on line 3—3 of Figure 2, looking in the direction of the arrows; and Figure 4 is a view in reduced scale of a portion of my device showing the same up-ended and the exposed ends of the locked cones being dipped in a tank or receptacle containing chocolate or other coating substance.

Referring to the drawing, the base 5 of my device is preferably constructed of sheet metal but may be of any suitable material. If desired, such device may be in the form of a closed case, but I prefer to make the same in the shape of an elongated box open at the sides for the purpose of rendering accessible the operative parts. At the top of said box are secured the two plates 6 and 9, having respectively the circular openings 7 and 8, registering one with the other and shaped to receive the shanks of cake cones 15 filled with ice cream. Interposed between the said plates 6 and 9 is the frame 11 sliding therebetween and provided with cross bars 13, to each of which are affixed pointed or spurs 14 positioned so as each to extend to a substantial extent into the space occupied or to be occupied by the shank of one of said cones. As shown, the amount of sliding movement of said frame 11 is limited by the play between the outermost of the bars 13 and the adjacent ends of the box 5. When the said frame 11 is slid to the right of the position occupied by it as shown in Figures 1 and 2, as far as it will go, the pins 14 will be clear of the passageways extending through the openings 7 and 8; and when moved in the opposite direction to the left as far as the frame will go, the shanks of the cones occupying such passageways will each be pierced or impaled by one of said pins. Handles 12, one of which is affixed to each end of said frame serve as a means of sliding the same into and out of the desired position; and handles 16, 16, similarly positioned on the ends of the box 5, enable the operator to up-end such box and readily to dip the exposed ends of the cones in the covering substance as shown in Figure 4.

To operate my improved device, I first stand the same upright as shown in Figure 2, and slide the frame 11 to such position so that the ends of the pins 14 will be well out of the passageways through the openings 7 and 8. Thereupon, I preferably completely fill all of said passageways with cake cones in which, in accordance with the usual practice, ice cream has been introduced as aforesaid and is protruding and extending beyond the mouths of said cones as hereinbefore described. If desired, a less number of cones could be used, but where extensive production is required, I have found it desirable to have provision made for as many cones as can be conveniently handled by the workman, in this case (as shown in the drawing) twenty-seven. After the cones have been so positioned, I carefully and firmly slide the frame 11 in the direction of the cones until the wall of the shanks of all of the cones have been pierced as shown by the pins 14. Where such pins have been firmly so lodged, I have found that for operative purposes, it is not necessary to lock the frame in position; the frozen mass of the ice cream in which the said pins are embedded being sufficient to preserve and ensure their proper engagement. Upon my device being so loaded with cones, the workman preferably by taking hold of the handles 16, 16, carefully up-ends the device to the position shown in Figure 4, and the ends of the cones are simultaneously dipped into the covering mixture C contained in the tank T. Such mixture may be cholocate, a candy solution, chopped nuts, fruit compounds, or any other desired coating which could be used for the purpose; and such coatings do not have to be limited to one coating, but could be successive and of any number or character. After the ends of the cones have been so dipped, my device, while still up-ended, is placed upon the packing table, the ends of said cones coming in contact therewith, and the said cones while remaining in such reversed position are released by sliding the frame 11 away from the same and thereby withdrawing the pins 14 from their penetrating contact with the wall of the cones as above set forth. Then the cones are left standing upright on said table, permitting the packers to touch only the shanks of the uncoated part of the cones. This method also speeds up the packing, since in packing the large coated end of the cone is preferably placed downward into the bag or other container.

While I have described my invention with particular reference to ice cream cones, and apparatus for dipping the same as hereinbefore set forth, I do not desire so to limit the same, since as is obvious my invention could be employed for dipping any confection in any substance desired to coat the same.

My invention may be embodied in other specific forms without departing from the spirit or essential characteristics thereof. The present embodiments of my invention as hereinbefore set forth are therefore to be considered in all respects as illustrative and not restrictive, the scope of my invention being indicated by the appended claims, and all changes which come within the meaning and range of equivalency of the claims are therefore intended to be embraced therein.

What I claim and desire to secure by Letters Patent is:

1. In an ice cream cone dipping device, the combination of a rack provided with openings shaped to receive and hold the shanks of cake cones filled with ice cream, a frame connected with and constructed to slide upon said rack, pins mounted upon said frame and positioned to penetrate the wall of the shanks of said cones while same are up-ended for the purpose of dipping without dislodgement, the exposed contents thereof.

2. In an ice cream cone dipping device, the combination of a rack provided with openings shaped to receive and normally hold in an upright position a plurality of filled ice cream cones, a frame mounted upon said rack and constructed to slide laterally against said cones, pins secured to said frame and positioned to penetrate the wall of the shanks of said cones and to become imbedded in a mass of ice cream therein contained, and thereby hold said cones in operative position without dislodgement when the same are up-ended for the purpose of dipping the exposed contents thereof in covering compounds.

3. In an ice cream cone dipping device, the combination of a box, two plates attached to the top of said box and forming a double deck with a space between, said plates having aligned openings shaped to receive the shanks of filled ice cream cones, a frame mounted upon said box and constructed to slide within the space between said plates, to and from said cones, pins secured to said frame and positioned to make impaling contact with the shanks of said cones and to secure the same from dislodgement while they are being up-ended for the purpose of dipping the exposed contents thereof.

4. In an ice cream cone dipping device, the combination of a box, two decks each parallel to the other and affixed to the top of said box, said decks having a plurality of openings aligned one with the other and shaped to receive the shanks of ice cream cones, a frame interposed in the space between said decks and arranged to slide to and from said openings, rods secured to said frame and extending laterally thereof, pins secured to said rods and positioned to make impaling contact with the shanks of said cones and to prevent the same from dislodgment when the said box is otherwise than in an upright position.

5. In a device for dipping and coating confections, a rack having a plurality of openings shaped to receive and constructed to hold confections and to protrude parts thereof, a frame mounted upon said rack and movable in respect thereto, pointed securing means for penetrating the bodies of said confections and connected with said frame and operated thereby, whereby the said rack may be upended and the protruding parts of said confections dipped without dislodgment into covering material.

6. In a device for dipping and coating confections, the combination of a base, a rack secured thereto, said rack having a plurality of openings each adapted to receive and hold a confection and to protrude the same therefrom, a frame mounted upon said rack and movable in respect thereto and to and from said confections, and pointed instrumentalities secured to said frame and positioned to penetrate without injury said confections upon movement of said frame toward the same and to secure said confections from dislodgment from said said openings when upended for the purpose of dipping the protruding ends thereof.

JAMES A. LEWIS.